United States Patent [19]
Saito

[11] Patent Number: 5,687,044
[45] Date of Patent: Nov. 11, 1997

[54] MAGNETORESISTIVE HEAD WITH MICRO-CRYSTALLITE SHIELDING LAYER

[75] Inventor: Masamichi Saito, Nagaoka, Japan

[73] Assignee: Alps Electric Co., Ltd., Tokyo, Japan

[21] Appl. No.: 461,801

[22] Filed: Jun. 5, 1995

[30] Foreign Application Priority Data

Jun. 7, 1994 [JP] Japan .................. 6-148591

[51] Int. Cl.[6] ....................................... G11B 5/39
[52] U.S. Cl. ........................................... 360/113
[58] Field of Search ............................ 360/113, 125, 360/126

[56] References Cited

U.S. PATENT DOCUMENTS

| | | | |
|---|---|---|---|
| 3,908,194 | 9/1975 | Romankiw | 360/113 |
| 3,975,772 | 8/1976 | Lin | 360/113 |
| 4,321,640 | 3/1982 | van Gestel | 360/113 |
| 4,547,824 | 10/1985 | Best et al. | 360/113 |
| 4,843,506 | 6/1989 | Gill et al. | 360/113 |
| 5,244,627 | 9/1993 | Katsuki | 420/127 |
| 5,515,221 | 5/1996 | Gill et al. | 360/113 |

*Primary Examiner*—Stuart S. Levy
*Assistant Examiner*—George J. Letscher
*Attorney, Agent, or Firm*—Guy W. Shoup; Patrick T. Bever

[57] ABSTRACT

An MR head includes a soft magnetic (SAL) layer, a nonmagnetic (SHUNT) layer, and a magnetoresistive (MR) layer, which are formed on top of each other, with shielding layers being formed on the upper and lower sides of these layers. The shielding layers, which are formed, for example, of an Fe-based fine crystalline material, are heated in a magnetic field, so that the magnetic permeability in the direction of the normal of the recording medium (the y-direction) of the shielding layers is higher than the magnetic permeability in the track-width direction (the x-direction) of the same, whereby it is possible to enhance the shielding effect of the shielding layers with respect to a leakage magnetic field from the recording medium. Further, due to the relatively low magnetic permeability in the x-direction of the shielding layers, a bias magnetic field imparted to the magnetoresistive layer from the hard bias layer is not easily drawn in the shielding layers.

6 Claims, 4 Drawing Sheets

FIG. 2A
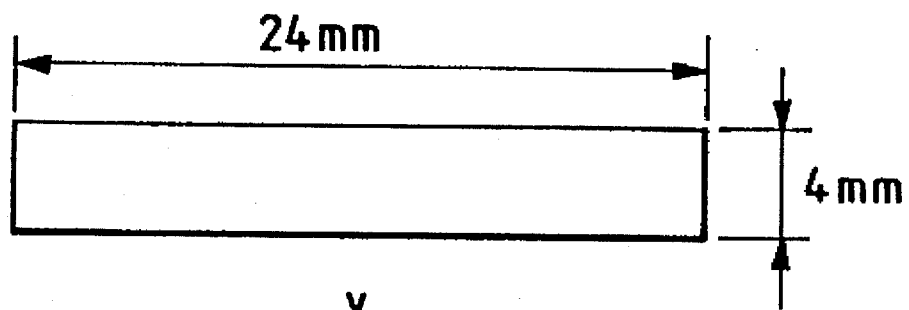
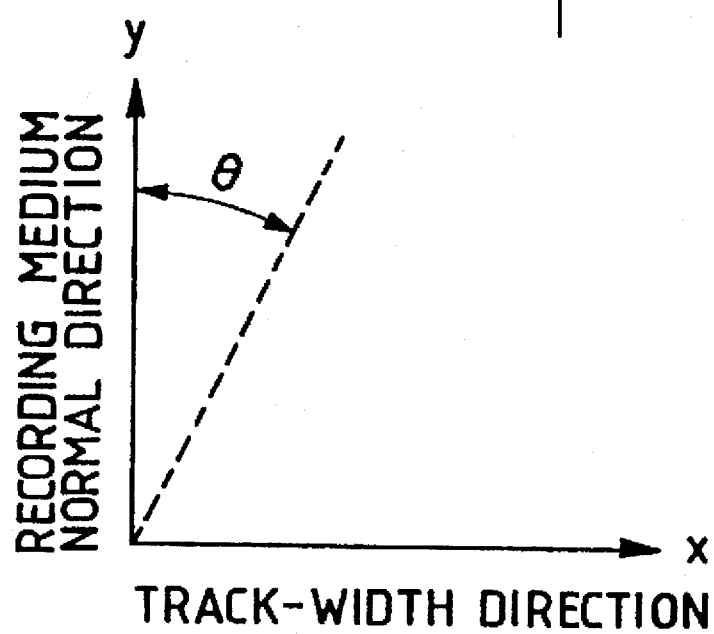
FIG. 2B

MAGNETORESISTIVE HEAD WITH MICRO-CRYSTALLITE SHIELDING LAYER

BACKGROUND OF THE INVENTION

The present invention relates to an MR (magnetoresistive) head that is to be mounted, for example, on a flying-type magnetic head for hard disc apparatuses to provide a reproducing function, and, in particular, to an MR head in which the magnetic shielding effect for the magnetoresistive layer can be enhanced.

DESCRIPTION OF THE RELATED ART

FIG. 5 is a sectional view, seen from the recording-medium side, of an exchange-bias-type MR (magnetoresistive) head.

In this MR head, a SAL (soft magnetic) layer 2, a SHUNT (non-magnetic) layer 3, and an MR (magnetoresistive) layer 4 are sequentially formed on top of each other in this order on a lower insulating layer 1. An antiferromagnetic layer 5 is formed on the surface of the magnetoresistive layer 4 except for the surface portion thereof corresponding to a Tw (track width) region, and a lead layer 6 is formed on the antiferromagnetic layer 5. Further, an upper insulating layer 7 is formed thereon.

In the exchange bias system, the magnetoresistive layer is magnetized in the x-direction to become a single magnetic domain due to the effect of the exchange anisotropy of the interface between the magnetoresistive layer 4 and the antiferromagnetic layer 5, which are stacked on top of each other in region B. Further, an electric-current magnetic field generated when a sense current flows through the magnetoresistive layer 4 is applied in the y-direction to the soft magnetic layer 2, whereby the soft magnetic layer 2 is magnetized in the y-direction. A lateral bias magnetic field is imparted in the y-direction to region A of the magnetoresistive layer 4 due to the magnetostatic bond energy given by the soft magnetic layer, magnetized in the y-direction. When this lateral magnetic field is imparted to region A of the magnetoresistive layer 4, turned into a single magnetic domain in the x-direction, the variation in resistance in region A of the magnetoresistive layer 4 (magnetoresistive effect characteristic: H–R effect characteristic) is set in a state where it exhibits a linearity.

FIG. 6 is a sectional view, as seen from the recording-medium side, of a hard-bias-type MR head.

In the hard bias system, a SAL (soft magnetic) layer 2, a SHUNT (non-magnetic) layer 3, and an MR (magnetoresistive) layer 4 are formed on top of each other in this order on a lower insulating layer 1. The magnetoresistive layer 4 has a dimension corresponding to the Tw (track width).

Formed on either side portion (as seen in the drawing) of the lower insulating layer 1 are a hard bias layer 8 and a lead layer 9 which is stacked on top of the hard bias layer 8. The hard bias layer 8 is electrically connected to both sides, with respect to the track-width dimension, of the magnetoresistive layer 4, and an upper insulating layer 7 is formed on top of the above layers.

In this MR head, the hard bias layer 8 functions as a magnet which is magnetized in the x-direction (the longitudinal direction), and the magnetoresistive layer 4 is magnetized in the x-direction to become a single magnetic domain due to a longitudinal bias magnetic field imparted to the magnetoresistive layer 4 from the hard bias layer 8. In the hard bias system, a lateral bias magnetic field is imparted, as in the exchange bias system described above, in the y-direction to the magnetoresistive layer 4 by a magnetostatic bond energy given by the soft magnetic layer 2 when a sense current flows through the magnetoresistive layer 4, whereby the variation in resistance of the magnetoresistive layer 4 in response to changes in the magnetic field is set in a state in which it exhibits a linearity.

In this MR head, the recording medium is opposed to the head in a direction facing the plane of the drawing. The direction of the normal of the recording medium is the y-direction, which is perpendicular to the plane of the drawing. In reproducing operation, the z-direction is the direction in which the MR head and the recording medium move relative to each other. A sense current is imparted to the magnetoresistive layer 4 through the lead layer 6 or the lead layer 9 and the antiferromagnetic layer 5 or the hard bias layer 8, and a variation in electric resistance value due to the magnetoresistive effect (H–R effect) imparted to the magnetoresistive layer 4 is detected as a change in voltage in response to the sense current.

As shown in FIGS. 5 and 6, in an MR head of this type, the lower insulating layer 1 and the upper insulating layer 7 are placed between a lower shielding layer 10a and an upper shielding layer 11a in order to magnetically shield the magnetoresistive layer 4. By thus providing the shielding layers 10a and 11a, those components of leakage magnetic field from the magnetized recording medium which are not needed for the reproduction of recorded information or an external magnetism can be absorbed by the shielding layers 10 and 11.

Conventionally, Sendust (an Fe—Al—Si type material) has generally been used as the magnetic material for the upper and lower shielding layers 10a and 11a. However, use of Sendust as the material for the shielding layers entails the following problems:

(1) Sendust is a magnetically isotropic material, so that there is scarcely any difference in magnetic permeability ($\mu$) between the track-width direction (the x-direction), in which the magnetoresistive layer 4 is turned into a single magnetic domain, and the direction of the normal of the recording medium (the depth direction of the magnetic head) (the y-direction). The main purpose of providing the shielding layers 10a and 11a is to absorb those components of the leakage magnetic field in the y-direction from the recording medium which are not needed for detection. Thus, it is desirable that the x–y plane of the shielding layers be formed as a plane of easy magnetization and that the initial magnetic permeability in the y-direction be an optimum one. From this point of view, Sendust, which is a magnetically isotropic material that exhibits the same magnetic permeability in all directions, is not to be regarded as optimum as the material for the shielding layers.

(2) In particular, the hard-bias-type MR head shown in FIG. 6, in which a longitudinal bias magnetic field in the x-direction is imparted from the hard bias layer 8 to the magnetoresistive layer 4 to thereby turn the magnetoresistive layer 4 into a single magnetic domain in the x-direction, has a problem in that, when the shielding layers 10a and 11a are formed of a magnetically isotropic material like Sendust, and the magnetic permeability in the x-direction is relatively high, the above-mentioned longitudinal bias magnetic field in the x-direction is drawn into the shielding layers 10a and 11a, which influences the single-magnetic-domain formation in the x-direction of the magnetoresistive layer 4 to thereby affect the linearity of the magnetoresistive effect, thereby causing a reduction in detection accuracy and generating a detection noise.

(3) The soft magnetic layers, the non-magnetic layer 3, the magnetoresistive layer 4, etc. are very thin films having a thickness of approximately 250Å to 300Å. However, Sendust exhibits a considerable surface roughness, so that, when the component layers are formed by sputtering on the surface of the lower shielding layer 10a, which is made of Sendust, the accuracy in film formation and the magnetic characteristic of the above films degenerate.

SUMMARY OF THE INVENTION

The present invention has been made with a view toward solving the above problems. It is an object of the present invention to provide an MR head whose shielding layers are formed of a material which enables the plane including the track-width direction and the direction of the normal of the recording medium to be easily formed as a plane of easy magnetization and which exhibits a magnetic permeability that is higher in the direction of the normal of the recording medium than in any other direction, thereby attaining an enhancement in shielding function.

Another object of the present invention is to prevent the bias magnetic field imparted to the magnetoresistive layer from being influenced by the shielding layers.

Still another object of the present invention is to make it possible to prevent a deterioration in the film formation accuracy and the magnetic characteristic of the layers by forming the shielding layers of a material exhibiting small surface roughness.

In accordance with the present invention, there is provided an MR head of the type which includes a magnetoresistive layer, a bias layer for turning the magnetoresistive layer into a single magnetic domain in one direction, and shielding layers for magnetically shielding the magnetoresistive layer, the MR head facing a recording medium, wherein the magnetic permeability of the shielding layers is larger in the direction of the normal of the recording medium or in the direction of leakage magnetic field of the recording medium than in the direction of the single-magnetic-domain formation mentioned above.

The above-mentioned bias layer may be a hard bias layer which imparts a bias magnetic field to the magnetoresistive layer to turn it into a single magnetic domain by imparting a bias magnetic field to the magnetoresistive layer, or an antiferromagnetic layer (exchange bias layer) which turns the magnetoresistive layer into a single magnetic domain by the exchange anisotropy with the magnetoresistive layer.

It is desirable for the shielding layers to be made of a magnetic material of high magnetic anisotropy which enables the plane including the direction in which the magnetoresistive layer is turned into a single magnetic domain (or the track width direction) and the direction of the normal of the recording medium (the depth direction of the MR head; the y-direction) to be formed as a plane of easy magnetization.

It is desirable for the shielding layers, which are formed of a magnetic material of high magnetic anisotropy, to exhibit a magnetic permeability in the direction of the normal of the recording medium that can be set in the range of 1000 to 5000 with respect to a magnetic frequency of 1 MHz since that helps to enhance the shielding property. A more preferable range of the magnetic permeability in the direction of the normal of the recording medium with respect to the magnetic frequency of 1 MHz is not less than 2000 but not more than 4000. As a design value, a preferable initial magnetic permeability is approximately 3000. To make it possible to set the magnetic permeability in the direction of the normal of the recording medium in one of the above-mentioned ranges, and to enhance the shielding property with respect to a leakage magnetic field from the recording medium, it is desirable for the magnetic permeability in the track-width direction (or the direction of single-magnetic-domain formation in the magnetoresistive layer), which has little bearing on the shielding characteristic, to be less than 1000 with respect to the magnetic frequency of 1 MHz.

In the hard bias system, it is desirable for the magnetic permeability in the direction of single-magnetic-domain formation (the track-width direction) of the shielding layers to be low in order that the shielding layer may not affect the single-magnetic-domain formation in the magnetoresistive layer. The magnetic permeability in the single-magnetic-domain formation (the track-width) direction of the shielding layers is preferably less than 1000 or not more than 500, and more preferably, not more than 200, with respect to the magnetic frequency of 1 MHz.

Further, it is possible for the shielding layers to be formed of a magnetic material that allows control of magnetic anisotropy by imparting a magnetic field thereto while heating the shielding layers. Preferable examples of such a magnetic material include Fe-based fine crystalline materials containing carbon, nitrogen and boron.

In the shielding layer of the above means, the magnetic permeability in the direction of the normal of the recording medium is higher than the magnetic permeability in any other direction, for example, the direction of the single-magnetic-domain formation in the magnetoresistive layer. The shielding layers serve to absorb those magnetism components of the leakage magnetic field from the recording medium which are not needed for detection (reproduction) (i.e., the magnetism components other than those to be detected or reproduced). Thus, by setting the magnetic permeability in the direction of the normal of the recording medium of the shielding layers at a level higher than its magnetic permeability in any other direction, it is possible to achieve a substantial enhancement in shielding effect.

When, as in the case of the hard bias system, a longitudinal bias magnetic field is given in the direction in which single-magnetic-domain formation occurs in the magnetoresistive layer (i.e, the track-width direction), it is possible to eliminate the problem of the longitudinal bias magnetic field being drawn in the shielding layers by setting the magnetic permeability in the direction of single-magnetic-domain formation of the shielding layer at a relatively low level, whereby the single-magnetic-domain formation in the magnetoresistive layer is not hindered, thereby securing the requisite accuracy in linearity of the magnetoresistive effect.

When the shielding layer is formed of a magnetic material that allows magnetic-anisotropy control by imparting a magnetic field thereto while heating the shielding layer, for example, an Fe-based fine crystalline material, containing carbon, nitrogen or boron, it is possible for the magnetic permeability in the direction of the normal of the recording medium and the magnetic permeability in the direction of single-magnetic-domain formation to be easily controlled by appropriately setting the conditions regarding the external magnetic field during heating, etc. Further, since the above-mentioned Fe-based fine crystalline material has a large coefficient of linear expansion, a tensile stress in an in-plane direction is imparted to the shielding layers during film formation or heating process. Due to the magnetoelastic effect at this time, the plane of easy magnetization of the shielding layer is in a plane including the track-width direction and the direction of the normal of the recording medium. Accordingly, it is possible to effect adjustment (control) to make the magnetic permeability in the direction of the normal of the recording medium relatively high, thereby making it possible, as stated above, to achieve an enhancement in shielding effect.

BRIEF DESCRIPTION OF THE DRAWINGS

FIG. 3 is a sectional view showing an exchange-bias-type MR head incorporating shielding layers in accordance with the present invention; and FIG. 4 is a sectional view showing a hard-bias-type MR head incorporating shielding layers in accordance with the present invention.

DESCRIPTION OF THE PREFERRED EMBODIMENT

Figure 1:
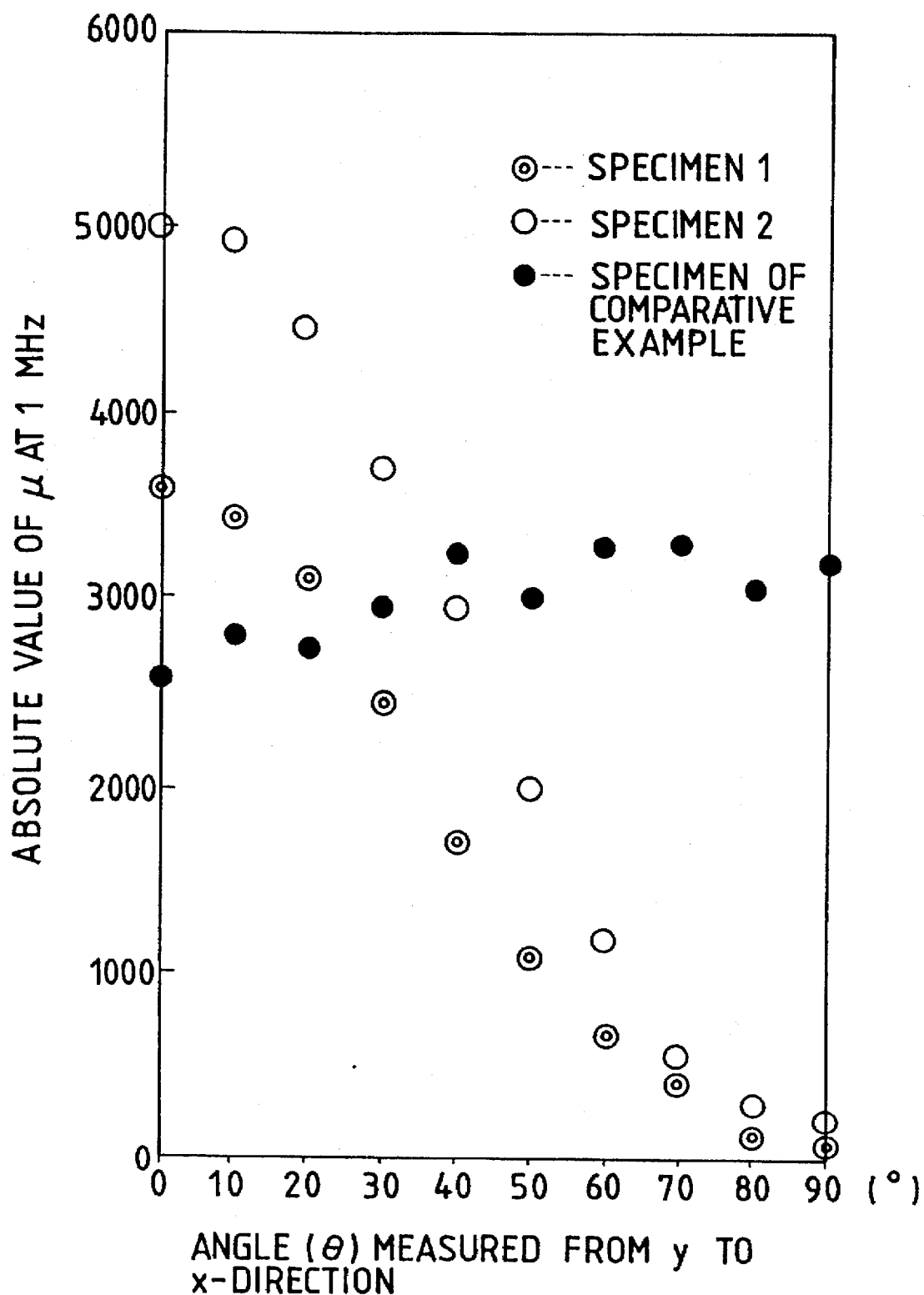
FIG. 1 is a chart comparing iron-type crystallite materials constituting the material for the MR head of the present invention with Sendust, which is a conventional material for shielding layers.

An embodiment of the present invention will now be described with reference to the drawings.

The MR head of the present invention has a structure which is of an exchange bias type as shown in FIG. 3 or a hard bias type as shown in FIG. 4.

This MR head is to be provided, for example, on the trailing-side end surface of a flying-type magnetic head for use in a hard disk apparatus. This magnetic head functions as a reproducing head. In the case of a compound head for both recording and reproduction, a recording magnetic head section in the form of a thin film is formed on an upper shielding layer 11b. It is also possible for the recording magnetic head to be formed as a thin film using the upper shielding layer 11b as the lower core of the recording magnetic head.

The recording surface of a recording medium, such as a hard disk, faces the magnetic head in a direction parallel to the plane of the drawing. The x-direction is the direction of the track width, and the z-direction is a direction in which the magnetic head and the recording medium move relative to each other. The direction of the normal of the recording medium (the depth direction of the MR head) is the y-direction (a direction perpendicular to the plane of the drawing and toward the depth of the plane).

In the MR heads shown in FIGS. 3 and 4, the magnetoresistive layer 4 consists of an Ni—Fe-type material layer having a thickness of approximately 300 Å, the non-magnetic layer 3 consists of a Ta layer having a thickness of approximately 200 Å, and the soft magnetic layer 2 consists of an Fe—Ni—Nb (iron-nickel-niobium)-type material layer having a thickness of approximately 250 Å.

In the exchange bias type shown in FIG. 3, the antiferromagnetic layer (the exchange bias layer) 5 consists of an Fe—Mn-type material layer having a thickness of approximately 300 Å, and the lead layer 6 consists of a Cr (chromium) layer. In the hard bias type shown in FIG. 4, the hard bias layer 8 consists of a Cr (chromium) layer having a thickness of approximately 100 Å and a Co—Cr—Ta type or Co—Pt type material layer formed on the Cr layer and having a thickness of approximately 500 Å. The lead layer 9 consists of a Cr layer having a thickness of 800 Å.

The lower and upper insulating layers 1 and 7 consist of $Al_2O_3$ films.

According to an embodiment of the present invention, in an MR head having the structure shown in FIG. 3 or 4, the magnetic permeability in the direction of the normal of the recording medium (the y-direction) of the lower and upper shielding layers 10b and 11b is higher than the magnetic permeability in the Tw (track-width) direction (the direction in which the single-magnetic-domain formation occurs in the magnetoresistive layer 4, i.e., the x-direction) of the shielding layers.

Each shielding layer is formed of a magnetic material that allows magnetic anisotropy control by imparting a magnetic field thereto and heating it. For example, it is made of an Fe-based fine crystalline material which is in an amorphous state during film formation and which is turned into a crystallite material after heat treatment. Specifically, it is an iron-type crystallite material containing carbon, nitrogen or boron. The following are examples of this iron-type crystallite material:

*Fe—M—C
*Fe—M—N
*Fe—M—B
*Fe—Nb—B—Si—Cu where Fe is iron, C is carbon, N is nitrogen, B is boron, Nb is niobium, Si is silicon, and Cu is copper. Symbol M indicates one or a plurality of elements selected from the group of metal elements: Si, Ti, V, Cr, Zr, Nb, Mo, W, Ni, Co, etc.

These Fe-based fine crystalline materials exhibit a large coefficient of linear expansion (α), so that, due to the difference in coefficient of linear expansion as compared with other types of substrates, it exhibits a large tensile stress in the in-plane direction of the layer (film) during film formation or heat treatment. Due to the magnetoelastic effect due to this tensile stress, the plane of easy magnetization is in a plane including the track-width direction (the x-direction) and the direction of the normal of the recording medium (the y-direction). When the material contains Al, it is possible to adjust the induced anisotropy in the above-mentioned plane by adjusting the amount of Al in the material.

With the above-mentioned material, the magnetic permeability in the y-direction of the shielding layers 10b and 11b is made higher than the magnetic permeability in the x-direction of the same by performing heat treatment on the above-mentioned material, formed into a film in an amorphous state, while imparting a magnetic field thereto in the x-direction or in the x and y-directions. In this way, the magnetic permeability in the y-direction can be made higher than the magnetic permeability in the x-direction. The adjustment of the magnetic permeability in the y-direction can be effected in terms of material composition, heating condition, the direction and strength of magnetic field imparted during heating, etc.

The shielding layers 10b and 11b draw in the components other than those components in the y-direction of the magnetism from the recording medium which are to be detected by the magnetoresistive layer 4, thereby providing a shielding effect. Thus, by making the magnetic permeability in the y-direction, which is the direction of the leakage magnetic field from the recording medium (the direction of the normal), higher than the magnetic permeability in any other direction, it is possible to attain an enhancement in shielding effect.

It is desirable that the magnetic permeability in the y-direction be set within the range of 1000 to 5000 with respect to the magnetic frequency of 1 MHz through appropriate setting of the above-mentioned conditions for the formation of the shielding layers 10b and 11b. To attain a further enhancement in shielding effect with respect to the leakage magnetic field from the recording medium, it is desirable that the magnetic permeability in the y-direction be not less than 2000 but not more than 4000 with respect to the magnetic frequency of 1 MHz. As a design value, it is desirable for the magnetic permeability in the y-direction to be approximately 3000.

To set the magnetic permeability in the y-direction in the above-mentioned range, it is desirable for the magnetic permeability in the track-width direction (the x-direction) of the shielding layers be less than 1000.

In the hard bias type shown in FIG. 4, a longitudinal bias magnetic field in the x-direction is imparted from the hard bias layer 8 to the magnetoresistive layer 4. Due to this longitudinal bias magnetic field, the magnetoresistive layer 4 is turned into a single magnetic domain in the x-direction.

An electric-current magnetic field generated when a sense current flows through the magnetoresistive layer 4 is applied in the y-direction to the soft magnetic layer 2, thereby magnetizing the soft magnetic layer 2 in the y-direction. Due to a magnetostatic bond energy given by the soft magnetic layer, magnetized in the y-direction, a lateral bias magnetic current is imparted in the y-direction to region A of the magnetoresistive layer 4. Due to the lateral bias magnetic field in the y-direction, which is applied to the magnetoresistive layer 4 from the soft magnetic layer 2, the linearity of the magnetoresistive effect is ensured. To make it harder for the longitudinal bias magnetic field from the hard bias layer 8 to the magnetoresistive layer 4 to be drawn in the shielding layers 10b and 11b to thereby facilitate the above-mentioned single-magnetic-domain formation, it is desirable for the magnetic permeability in the x-direction of the shielding layers to be less than 1000 or not more, than 500, or, more preferably, not more than 200 with respect to the magnetic frequency of 1 MHz.

Examples of a magnetic material allowing magnetic-anisotropy control, with which the magnetic permeability in the y-direction can be made higher than the magnetic permeability in the x-direction, include, apart from the above-mentioned Fe-based fine crystalline materials, permalloy and cobalt-type amorphous materials. Thus, the scope of the present invention also covers a case in which the shielding layers are formed of permalloy or a cobalt-type amorphous material.

Figure 2A:
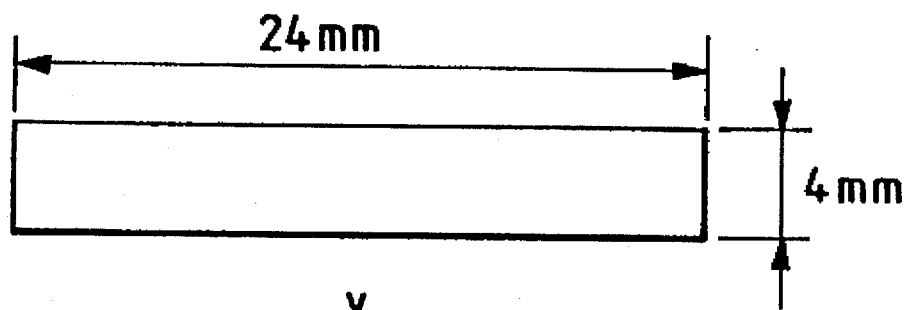
FIGS. 2A and 2B are diagrams illustrating a specimen used in a measurement the results of which are plotted in FIG. 1.

To examine the relationship between the heat-treatment conditions and the magnetic permeability in different directions, an experiment was conducted on an Fe-based fine crystalline material containing carbon, used as the material for the shielding layers. The following are the results of the experiment:

This experiment used a specimen as shown in FIG. 2A, which has a size of 24 mm×4 mm. The size of the shielding layer of an actually used MR head is, for example, approximately 150 μm×40 μm. However, this is too small to allow the magnetic-permeability measurement to be conducted correctly. That is why a specimen having the size shown in FIG. 2A was used in the experiment.

(a) Experimental Specimen I

This is an example of the material for the shielding layers of the MR head. It is an Fe-based fine crystalline material containing carbon.

The material, having a composition of $Fe_{67}Al_{10}Ta_{10}C_{13}$ (at%), was formed into a film by sputtering to a thickness of 1.5 μm on a glass substrate having a configuration as shown in FIG. 2A. During the film formation, the material is in an amorphous state. The material was then heated at 550° C. for 30 minutes to turn it into a crystallite. This heating was conducted in a magnetic field having strength in the x-direction (a direction corresponding to the track-width direction of the MR head) of 200 (Oe).

(a) Experimental Specimen II

This is also to be used as the material for the shielding layers of the MR head of the present invention. It has the same composition as that of Specimen I, $Fe_{67}Al_{10}Ta_{10}C_{13}$ (at%). The specimen was formed into a film by sputtering to a thickness of 1.5 μm on a glass substrate having a configuration as shown in FIG. 2A. The material was subjected to heat treatment under the same conditions (in terms of temperature and magnetic field) as those for Specimen 1. After this, it was further heated at 400° C. for 30 minutes in a magnetic field having a strength in the y-direction of 200 (Oe).

(C) Specimen of Comparative Example

The sendust layer used in the shielding layers of the above-described conventional MR head was used as a specimen of a Comparative example. Sendust ($Fe_{75}Al_{10}Si_{15}$) (at%), was formed into a film by sputtering to a thickness of 1.5 μm on a glass substrate having a configuration as shown in FIG. 2A and was then heated at 550° C. for 30 minutes under a non-magnetic-field condition.

Figure 2B:
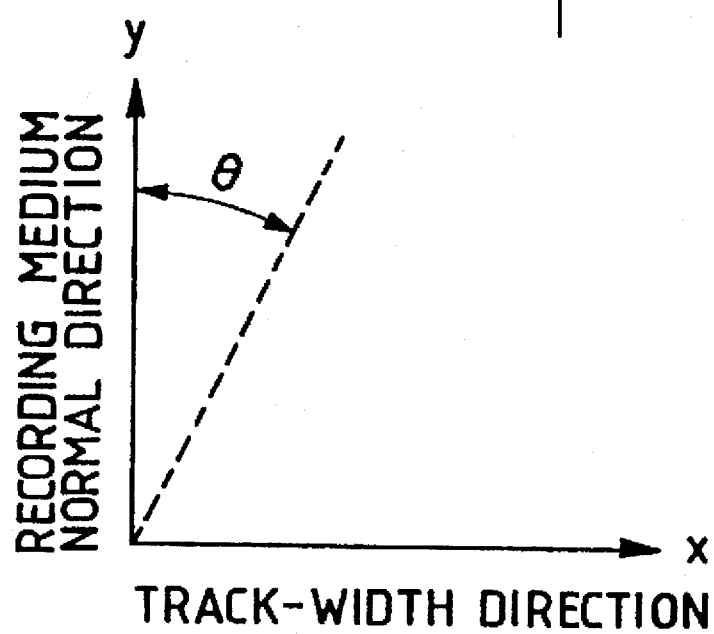
Figure 5:
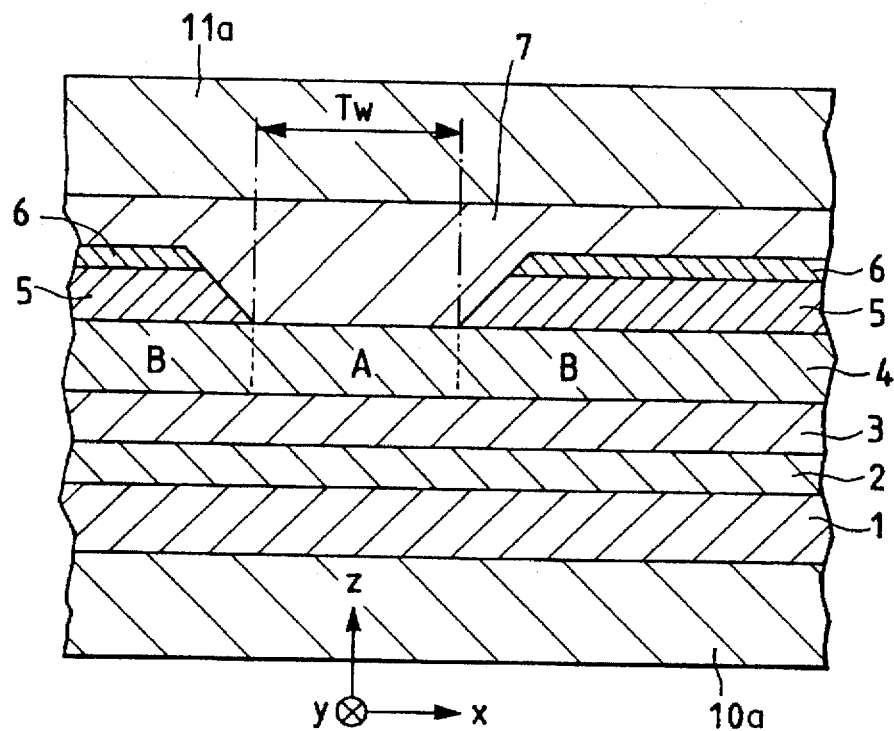
FIG. 5 is a sectional view showing an exchange-bias-type MR head incorporating conventional shielding layers.
Figure 6:
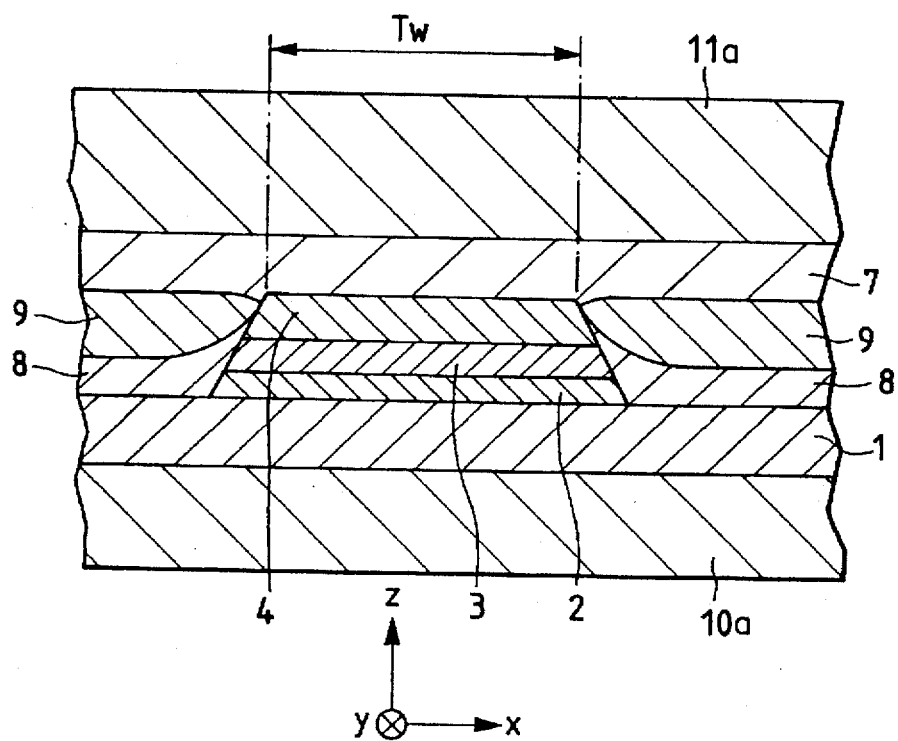
FIG. 6 is a sectional view showing a hard-bias-type MR head incorporating conventional shielding layers.

Magnetic permeability measurement was performed on the above three kinds of specimen, in terms of permeability in the y-direction, permeability in the x-direction, and permeability in a direction inclined by an angle θ from the y-direction toward the x-direction (refer to FIG. 2B). FIG. 1 shows the results of the measurement.

In FIG. 1, the horizontal axis indicates the angle θ from the y-direction, and the vertical axis indicates the absolute value of magnetic permeability (μ) with respect to the magnetic frequency of 1 MHz of each specimen as measured in the direction of the angle θ. The angle θ=0 corresponds to the y-direction (the direction of the normal of the recording medium). The angle θ=90° corresponds to the x-direction (the track-width direction).

The chart of FIG. 1 shows that, in the case of sendust, there is scarcely any difference in magnetic permeability (μ) between different directions in the x–y plane, thus indicating the magnetic isotropy of sendust.

In the case of Specimens I and II, the magnetic permeability differs with the direction even if the composition is the same. This is to be controlled in terms of temperature in the heat treatment and the direction of the magnetic field. It can be seen that Specimen II, which has been heated at 400° C. for 30 minutes with a y-direction magnetic field imparted thereto, exhibits a magnetic permeability in the y-direction which is higher than that of Specimen I, which has been heated at 500° C. for 30 minutes in magnetic field in the x-direction. Through this setting of the heating temperature and the magnetic-field direction, it is possible to control the magnetic permeability in the y-direction. Thus, it will be seen that, in FIG. 1, it is possible to set the magnetic permeability in the y-direction at a level not less than 1000 but not more than 5000, or not less than 2000 but not more than 4000, or at a level of approximately 3000. Further, it can be seen that the magnetic permeability in the x-direction is not more than 1000, or, more preferably, not more than 200.

Further, the film surface of each specimen was observed by using an AFM (atomic force microscope). The distance between the crest and bottom of the surface irregularities on the film surface was 5 nm in Specimens I and II, and 15 nm in specimen of the comparative example. Thus, the surface roughness of the iron-type crystallite material is much lower than that of sendust. In the MR heads shown in FIGS. 3 and 4, each of the layers sequentially formed on the lower shielding layer 10b has a small thickness of approximately several hundred Å. Thus, when an Fe-based fine crystalline material is used as the material of the shielding layer 10, it is possible for the film formation accuracy of each layer and the magnetic characteristic thereof to be high due to the small surface roughness of the material.

Thus, it can be seen that Specimens I and II of the present invention constitute preferable examples of the material for the shielding layers 10b and 11b in the MR heads shown in FIGS. 3 and 4.

The MR head of the present invention is not restricted to a flying-type magnetic head, but also applicable to other types of magnetic heads and magnetic detectors.

Further, while the present invention has been described with reference to a case in which it is applied to both the upper and lower shielding layers for magnetically shielding the magnetoresistive layer, it is also possible for only the lower shielding layer to consist of a shielding layer according to the present invention. In that case, when the MR head is a compound magnetic head for both recording and reproduction, the upper shielding layer also serves as the lower core of the recording magnetic head and has no features of the shielding layer of the present invention and has the same magnetic property as the upper core. Such a construction is also covered by the scope of the present invention.

It is also possible for the upper shielding layer, also serving as the lower core, to have the features of the shielding layer of the present invention.

Further, when, in the case of a compound magnetic head for both recording and reproduction, an MR head is provided in the magnetic gap of the recording magnetic head, the upper and lower cores of the recording magnetic head may function as the upper and lower shielding layers, respectively, with the upper and lower cores having the features of the shielding layer of the present invention.

As described above, in the MR head of the present invention, the magnetic permeability of the shielding layer in the direction of the normal of the recording medium is higher than the magnetic permeability in the direction of single-magnetic-domain formation of the magnetoresistive layer. Thus, it is possible to enhance the shielding effect with respect to the magnetic field from the recording medium. When a bias magnetic field in the direction of single-magnetic-domain formation is imparted from the bias layer to the magnetoresistive layer, the bias magnetic field is not easily drawn in the shielding layer due to the low magnetic permeability in the direction of single-magnetic-domain formation of the shielding layer, thereby enhancing the accuracy in single-magnetic-domain formation in the magnetoresistive layer and achieving a reduction in noise.

When a magnetic material which allows magnetic-anisotropy control through heat-treatment in magnetic field is used as the material for the shielding layer, it is possible to control the magnetic permeability of the shielding layer, for example, the magnetic permeability thereof in the direction of the normal of the recording medium of the shielding layer, through appropriate adjustment of heating temperature, the direction or strength of magnetic field, etc., thereby making it possible to form a shielding layer having an optimum shielding effect.

When an iron-type crystallite material is used as the above magnetic material, it is possible for the plane of easy magnetization to be a plane including the direction of the normal of the recording medium and the direction of single-magnetic-domain formation. Further, as stated above, it is possible to impart anisotropy to the magnetic permeability through heating in a magnetic field.

What is claimed is:

1. An MR head comprising:

a magnetoresistive layer;

a bias layer which causes single-magnetic-domain formation in one direction to occur in the magnetoresistive layer; and a shielding layer for magnetically shielding the magnetoresistive layer, the shielding layer having a magnetic permeability directed such that, when said MR head is disposed to face a recording medium, the magnetic permeability is higher in a direction normal to a surface of the recording medium than in the direction of the single-magnetic domain formation;

wherein the shielding layer comprises one or more from the group consisting of Fe—M—C, Fe—M—B, Fe—M—N and Fe—Nb—Si—B—Cu, wherein M is one or more of Al, Ta, Hf, Si, Ti, V, Cr, Zr, Nb, Mo, W, Ni and Co, and wherein the magnetic permeability in the direction normal to the recording medium with respect to a magnetic frequency of 1 MHz is in the range of 2000 to 4000, and the magnetic permeability in the direction of the single-magnetic-domain formation with respect to the magnetic frequency is less than 500.

2. An MR head comprising:

a magnetoresistive layer;

a bias layer which causes single-magnetic-domain formation in one direction to occur in the magnetoresistive layer; and two shielding layers for magnetically shielding the upper and lower sides of the magnetoresistive layer, the shielding layers each having a magnetic permeability directed such that, when said MR head is disposed to face a recording medium, the magnetic permeability is higher in a direction normal to a surface of the recording medium than in the direction of the single-magnetic domain formation;

wherein the shielding layers comprise one or more from the group consisting of Fe—M—C, Fe—M—B, Fe—M—N and Fe—Nb—Si—B—Cu, wherein M is one or more of Al, Ta, Hf, Si, Ti, V, Cr, Zr, Nb, Mo, W, Ni and Co, and wherein the magnetic permeability in the direction normal to the recording medium with respect to a magnetic frequency of 1 MHz is in the range of 2000 to 4000, and the magnetic permeability in the direction of the single-magnetic-domain formation with respect to the magnetic frequency is less than 500.

3. An MR head formed as a compound magnetic head for both recording and reproduction comprising at least a lower shielding layer, a magnetoresistive layer, an upper shielding layer, a lower core layer, and an upper core layer sequentially formed on a substrate;

wherein the lower shielding layer and the upper shielding layer exhibit a magnetic permeability that is higher in a direction normal to a surface of a recording medium which faces the MR head than in a direction of a single-magnetic-domain formation in which the magnetoresistive layer is turned into a single magnetic domain in direction, wherein the shielding layers comprise one or more from the group consisting of Fe—M—C, Fe—M—B, Fe—M—N and Fe—Nb—Si—B—Cu, wherein M is one or more of Al, Ta, Hf, Si, Ti, V, Cr, Zr, Nb, Mo, W, Ni and Co, and wherein the magnetic permeability in the direction normal to the recording medium with respect to a magnetic frequency of 1 MHz is in the range of 2000 to 4000, and the magnetic permeability in the direction of the single-magnetic-domain formation with respect to the magnetic frequency is less than 500.

4. An MR head formed as a compound magnetic head for both recording and reproduction comprising at least a lower shielding layer, a magnetoresistive layer, a lower core layer which also serves as an upper shielding layer, and an upper core layer are sequentially formed on a substrate;

wherein the lower shielding layer and the lower core layer also serving as the upper shielding layer exhibit a magnetic permeability that is higher in a direction normal to a surface of a recording medium which faces the MR head than in a direction of a single-magnetic-domain formation in which the magnetoresistive layer is turned into a single magnetic domain in one direction, wherein the shielding layers comprise one or more from the group consisting of Fe—M—C, Fe—M—B, Fe—M—N and Fe—Nb—Si—B—Cu, wherein M is one or more of Al, Ta, Hf, Si, Ti, V, Cr, Zr, Nb, Mo, W, Ni and Co, and wherein the magnetic permeability in the direction normal to the recording medium with respect to a magnetic frequency of 1 MHz is in the range of 2000 to 4000, and the magnetic permeability in the direction of the single-magnetic-domain formation with respect to the magnetic frequency is less than 500.

5. An MR head formed as a compound magnetic head for both recording and reproduction comprising at least a lower shielding layer, a magnetoresistive layer, a lower core layer which also serves as an upper shielding layer, and an upper core layer are sequentially formed on a substrate;

wherein the lower shielding layer exhibits a magnetic permeability that is higher in a direction normal to a surface of a recording medium which faces the MR head than in a direction of a single-magnetic-domain formation in which the magnetoresistive layer is turned into a single magnetic domain in one direction, wherein the lower shielding layer comprises one or more from the group consisting of Fe—M—C, Fe—M—B, Fe—M—N and Fe—Nb—Si—B—Cu, wherein M is one or more of Al, Ta, Hf, Si, Ti, V, Cr, Zr, Nb, Mo, W, Ni and Co, and wherein the magnetic permeability in the direction normal to the recording medium with respect to a magnetic frequency of 1 MHz is in the range of 2000 to 4000, and the magnetic permeability in the direction of the single-magnetic-domain formation with respect to the magnetic frequency is less than 500.

6. An MR head formed as a compound magnetic head for both recording and reproduction comprising at least a lower core layer which also serves as a lower shielding layer, a magnetic gap, and an upper core layer which also serves as an upper shielding layer are sequentially formed on a substrate, with a magnetoresistive layer being provided in said magnetic gap;

wherein the lower core layer and the upper core layer exhibit a magnetic permeability that is higher in a direction normal to a surface of a recording medium which faces the MR head than in a direction of a single-magnetic-domain formation in which the magnetoresistive layer is turned into a single magnetic domain in one direction, wherein the lower core layer and the upper core layer comprise one or more from the group consisting of Fe—M—C, Fe—M—B, Fe—M—N and Fe—Nb—Si—B—Cu, wherein M is one or more of Al, Ta, Hf, Si, Ti, V, Cr, Zr, Nb, Mo, W, Ni and Co, and wherein the magnetic permeability in the direction normal to the recording medium with respect to a magnetic frequency of 1 MHz is in the range of 2000 to 4000, and the magnetic permeability in the direction of the single-magnetic-domain formation with respect to the magnetic frequency is less than 500.

* * * * *